US012799253B2

(12) United States Patent
Veige et al.

(10) Patent No.: US 12,799,253 B2
(45) Date of Patent: Nov. 17, 2026

(54) CYCLIC POLYACETYLENE AND METHODS OF PREPARING THE SAME

(71) Applicant: UNIVERSITY OF FLORIDA RESEARCH FOUNDATION, INCORPORATED, Gainesville, FL (US)

(72) Inventors: Adam S. Veige, Gainesville, FL (US); Stella Almeida Gonsales, Gainesville, FL (US); Zhihui Miao, Gainesville, FL (US); Brent S. Sumerlin, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 938 days.

(21) Appl. No.: 17/797,770

(22) PCT Filed: Feb. 12, 2021

(86) PCT No.: PCT/US2021/017916

§ 371 (c)(1),
(2) Date: Aug. 5, 2022

(87) PCT Pub. No.: WO2021/163533

PCT Pub. Date: Aug. 19, 2021

(65) Prior Publication Data

US 2023/0096942 A1 Mar. 30, 2023

Related U.S. Application Data

(60) Provisional application No. 62/976,768, filed on Feb. 14, 2020.

(51) Int. Cl.

| | |
|---|---|
| ***C08F 38/02*** | (2006.01) |
| ***C08F 138/02*** | (2006.01) |
| ***C08F 238/02*** | (2006.01) |
| ***C08F 293/00*** | (2006.01) |

(52) U.S. Cl.

CPC .......... *C08F 238/02* (2013.01); *C08F 293/00* (2013.01)

(58) Field of Classification Search

CPC ....... C08F 238/02; C08F 38/02; C08F 138/02
See application file for complete search history.

(56) References Cited

U.S. PATENT DOCUMENTS

| | | | | |
|---|---|---|---|---|
| 4,452,959 A * | 6/1984 | Kobayashi | C08F 38/02 526/159 |
| 4,600,756 A * | 7/1986 | Pedretti | C08F 38/02 526/159 |
| 8,362,311 B2 | 1/2013 | Schrock et al. | |
| 2014/0309389 A1 | 10/2014 | Veige et al. | |
| 2016/0009746 A1 | 1/2016 | Schrock et al. | |

FOREIGN PATENT DOCUMENTS

| | | | |
|---|---|---|---|
| EP | 3152241 B1 * | 8/2019 | C08F 30/08 |
| WO | 2015/191571 A1 | 12/2015 | |

OTHER PUBLICATIONS

Arakawa et al., Role of Long Conjugated Segments in the Electrical Property of Trans-Polyacetylene, Chem. Lett., 13:1637-1640 (1984).
Berets et al., Electrical Properties of Linear Polyacetylene. Transactions of the Faraday Society, 64, 823-& 10.1039/119686400823 (1968).
Bielawski et al., An “Endless” Route to Cyclic Polymers, Scien., 297(5589):2041-2044 (2002).
Chance et al., Linear optical properties of a series of linear polyenes: implications for polyacetylene, Synth. Metal., 49(1-3):271-280 (1992).
Chang et al., Recent Progress on the Synthesis of Cyclic Polymers via Ring-Expansion Strategies, J. Polym. Sci. Pol. Chem., 55:2892-2902 (2017).
Chen et al., Mechanochemical unzipping of insulating polyladderene to semiconducting polyacetylene, Science, 357:475-479 (2017).
Chiang et al., Synthesis of highly conducting films of derivatives of polyacetylene, (Ch)X. J. Am. Chem. Soc., 100(3):1013-1015 (1978).
Choi et al., Bond length alternation and aromaticity in large annulenes, J. Chem. Phys., 108:6681-6688 (1998).
Ehrenfreund et al., Amplitude and phase modes in trans-polyacetylene: Resonant Raman scattering and induced infrared activity, Phys. Rev. B., 36(3):1535-1553 (1987).
Gal et al., Synthesis of a Polyacetylene by Double Cyclopolymerization of Triyne Monomer and its Electro-optical and Electrochemical Properties, Mol. Cryst. Liq. Cryst., 579:95-102 (2013).
Gonsales et al., Highly Tactic Cyclic Polynorbornene: Stereoselective Ring Expansion Metathesis Polymerization of Norbornene Catalyzed by a New Tethered Tungsten-Alkylidene Catalyst. J. Am. Chem. Soc., 138(15):4996-4999 (2016).
Gorman et al., Soluble, highly conjugated derivatives of polyacetylene from the ring-opening metathesis polymerization of monosubstituted cyclooctatetraenes: synthesis and the relationship between polymer structure and physical properties, J. Am. Chem. Soc., 115:1397-1409 (1993).
Haberkorn et al., Structure And Conductivity of Poly (Acetylene), Synth. Met., 5: 51-71 (1982).
Heller et al., Raman Scattering in Carbon Nanosystems: Solving Polyacetylene, Solving Polyacetylene. ACS Central Sci., 1(1):40-49 (2015).
Hudson, Polyacetylene: Myth and Reality, Materials, 11(2):242 (2018).
International Application No. PCT/US2021/017916, International Preliminary Report on Patentability, mailed Aug. 25, 2022.

(Continued)

*Primary Examiner* — Michael J Feely
(74) *Attorney, Agent, or Firm* — MARSHALL, GERSTEIN & BORUN LLP

(57) ABSTRACT

Provided herein are trans-cyclic polyacetylenes and methods of preparing the trans-cyclic polyacetylenes.

19 Claims, 8 Drawing Sheets

(56) References Cited

OTHER PUBLICATIONS

International Application No. PCT/US2021/017916, International Search Report and Written Opinion, mailed Apr. 22, 2021.
Ito et al., Simultaneous polymerization and formation of polyacetylene film on the surface of concentrated soluble Ziegler-type catalyst solution, Journal of Polymer Science Part a-Polymer Chemistry, 12(1):11-20 (1974).
Kertesz et al., Conjugated polymers and aromaticity, Chemical Reviews, 105:3448-3481 (2005).
Knoll et al., Preparation of Tert-Butyl-Capped Polyenes Containing Up to 15 Double-Bonds, J. Am. Chem. Soc., 111(20): 7989-8004 (1989).
Kuzmany et al., Frank-Condon Approach for Optical-Absorption and Resonance Raman-Scattering in Trans-Polyacetylene, Phys. Rev. B., 26:7109-7112 (1982).
Lefrant, Resonance Raman Scattering Induced by Polyacetylene And Derivatives, Le Journal de Physique Colloques., 44, C3-247-C3-254 (1983).
Maricq et al., Carbon-13 Nuclear Magnetic-Resonance of Cis-Polyacetylenes and Trans-Polyacetylenes, J. Am. Chem. Soc., 100:7729-7730 (1978).
Miao et al., pH-Responsive water-soluble cyclic polymer. Macromol., 52(16):6260-6265 (2019).
Michel, Tunneling by 16 Carbons: Planar Bond Shifting in [16] Annulene, J. Am. Chem. Soc, 141:5286-5293 (2019).
Mullazzi et al., Experimental and theoretical Raman results in trans polyacetylene, Solid State Communications, 46:851-855 (1983).
Nadif et al., Introducing "Ynene" Metathesis: Ring-Expansion Metathesis Polymerization Leads to Highly Cis and Syndiotactic Cyclic Polymers of Norbornene, J. Am. Chem. Soc, 138(20):6408-6411 (2016).
Niu et al., Polypropylene: Now Available without Chain Ends, Chem., 5:237-244 (2019).
Oth, Conformational mobility and fast bond shift in the annulenes, In Pure and Appl Chem., 25:573 (1971).
Pal et al., Ultra-High-Molecular-Weight Macrocyclic Bottlebrushes via Post-Polymerization Modification of a Cyclic Polymer, Macromolecules, 53(22):9717-9724 (2020).
Roland et al., A catalytically relevant intermediate in the synthesis of cyclic polymers from alkynes, Chem. Commun., 55:13697-13700 (2019).
Roland et al., Cyclic polymers from alkynes, Nature Chemistry, 8(8):791-796 (2016).
Scherman et al., Direct synthesis of soluble, end-functionalized polyenes and polyacetylene block copolymers, J. Am. Chem. Soc., 125(28):8515-8522 (2003).
Scott et al., Decamethyl[5]pericyclyne. A Novel Homoconjugated Cyclic Polyacetylene, J. Am. Chem. Soc, 105(26):7760-7761 (1983).
Shirakawa et al., Infrared Spectra of Poly(acetylene), Polym. J., 2:231-244 (1971).
Shirakawa, Raman-scattering and electronic-spectra of poly(acetylene), Polym. J., 4:460-462 (1973).
Sondheimer et al., The synthesis of cyclooctadecanonaene, a new aromatic system, Tetrahedron Letters, 1:3-6 (1959).
Sondheimer et al., Unsaturated Macrocyclic Compounds. Xv.1 Cyclotetradecaheptaene, J. Am. Chem. Soc., 82:5765-5766 (1960).
Takashima et al., Synthesis of novel oxo complexes of tungsten and molybdenum with various chalcogen bridged chelating bis(aryloxo) ligands and their catalytic behavior for ring-opening metathesis polymerization, J. Org. Chem., 651:114-123 (2002).
Xia et al., Ring-Expansion Metathesis Polymerization: Catalyst-Dependent Polymerization Profiles, J. Am. Chem. Soc., 131(7):2670-2677 (2009).
Yoshizawa et al., Electron Correlation Effects and Possible D6h Structures in Large Cyclic Polyenes, J. Phys. Chem., 100(14):5697-5701 (1996).

* cited by examiner

CYCLIC POLYACETYLENE AND METHODS OF PREPARING THE SAME

CROSS-REFERENCE TO RELATED APPLICATIONS

This application is a National Stage application of International Application No. PCT/US2021/017916, filed Feb. 12, 2021, which claims the benefit under 35 U.S.C. § 119(e) of U.S. Provisional Patent Application No. 62/976,768, filed on Feb. 14, 2020, which are incorporated herein by reference in their entireties.

STATEMENT OF US GOVERNMENT SUPPORT

This invention was made with government support under grant number 1808234, awarded by the National Science Foundation. The government has certain rights in the invention.

BACKGROUND

[N]annulenes are ring compounds having the same empirical formula as benzene and the general formula $C_{2m}H_{2m}$, where the [N] is the number of carbon atoms 2 m. Sodenheimer isolated [18]annulene in 1959 (Sondheimer et al., *Tetrahedron Letters* 1959, 1, 3-6) and [30]annuelene in 1960 (Sondheimer et al., J. Am. Chem. Soc. 1960, 82, 5765-5766 and Kertesz et al., *Chemical Reviews* 2005, 105, 3448-3481). By tying together the chain ends of a linear polymer it is possible to dramatically alter its physical properties forming a cyclic polymer. However, cyclic polymers are inherently difficult to synthesize. With the potential of increasing the conductivity by orders of magnitude when doped and with various other application potentials, there is a need for a large [N]annulene.

SUMMARY

Provided herein are trans-cyclic polyacetylenes and methods of preparing the trans-cyclic polyacetylenes.

The disclosure provides methods of preparing a trans-cyclic polyacetylene comprising: admixing acetylene and a catalyst having a structure represented by formula(I) under conditions sufficient to polymerize the acetylene to form the trans-cyclic polyacetylene:

(1)

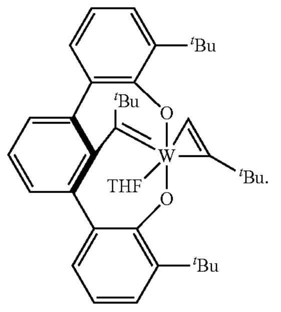

In embodiments, the admixing comprises contacting the acetylene with a catalyst solution of the catalyst and an aprotic solvent. In embodiments, the catalyst is coated on a substrate. In embodiments, the admixing comprises contacting the catalyst with an acetylene solution comprising a solvent and acetylene. In embodiments, the admixing comprises contacting acetylene gas with the catalyst. In embodiments, the acetylene gas further comprises acetone. In embodiments, acetylene, as acetylene gas, is flowed over the catalyst-coated substrate such that the trans-cyclic polyacetylene forms as a film on the substrate. In embdodiments, the trans-cyclic polyacetylene is a powder. In embodiments, the trans-cyclic polyacetylene is a film. In embodiments, the trans-cyclic polyacetylene is formed in solution and is soluble in said solution.

Also provided herein are trans-cyclic polyacetylenes prepared by the methods described herein.

Further provided herein are trans-cyclic polyacetylenes having at least 50 polymerized monomer units and at least 95% trans double bonds. In embodiments, the trans-cyclic polyacetylenes have less than 5% crosslinking defects. In embodiments, the trans-cyclic polyacetylenes have less than 2% crosslinking defects. In embodiments, the trans-cyclic polyacetylene have less than 1% crosslinking defects. In embodiments, the trans-cyclic polyacetylenes have at least 80 polymerized monomer units. In embodiments, the trans-cyclic polyacetylenes have at least 100 polymerized monomer units. In embodiments, the trans-cyclic polyacetylenes have an average conjugation length of at least 80. In embodiments, the trans-cyclic polyacetylenes have an average conjugation length is at least 100. In embodiments, the trans-cyclic polyacetylenes have at least 99% trans double bonds. In embodiments, the trans-cyclic polyacetylenes of the disclosure further comprising a dopant. In embodiments, the dopant comprises bromine, iodine, chlorine, inter halogens (e.g., ICl, IBr) $AsF_5$, $SbF_6$, $SbCl_6$, $HClO_4$, $H_2SO_4$, $(NO)(PF_6)$, $Ag(ClO_4)$, lithium, sodium, potassium, or a combination thereof. In embodiments, the trans-cyclic polyacetylenes have a conductivity of at least 100 $ohm^{-1}cm^{-1}$. In embodiments, the trans-cyclic polyacetylenes have a conductivity of at least 200 $ohm^{-1}cm^{-1}$. In embodiments, the trans-cyclic polyacetylenes have a conductivity of at least 300 $ohm^{-1}cm^{-1}$.

Also provided herein are coated substrates comprising the trans-cyclic polyacetylene of the disclosure and a substrate. In embodiments, the substrate comprises a metal, a polymer, silicon, a plastic, wood, glass, or a combination thereof.

BRIEF DESCRIPTION OF FIGURES

FIG. 11A shows an AFM photographic image of cyclic bottlebrush polymers as disclosed herein at a scale of 1 micrometer. FIG. 11B shows an AFM photographic image of cyclic bottlebrush polymers as disclosed herein at a scale of 1 micrometer. FIG. 11C shows an AFM photographic image of cyclic bottlebrush polymers as disclosed herein at a scale of 0.4 micrometers. FIG. 11D shows an AFM photographic image of cyclic bottlebrush polymers as disclosed herein at a scale of 0.4 micrometers. FIG. 11E shows an AFM photographic image of cyclic bottlebrush polymers as disclosed herein at a scale of 300 nanometers. FIG. 11F shows an AFM photographic image of cyclic bottlebrush polymers as disclosed herein at a scale of 300 nanometers.

DETAILED DESCRIPTION

Figure 1:
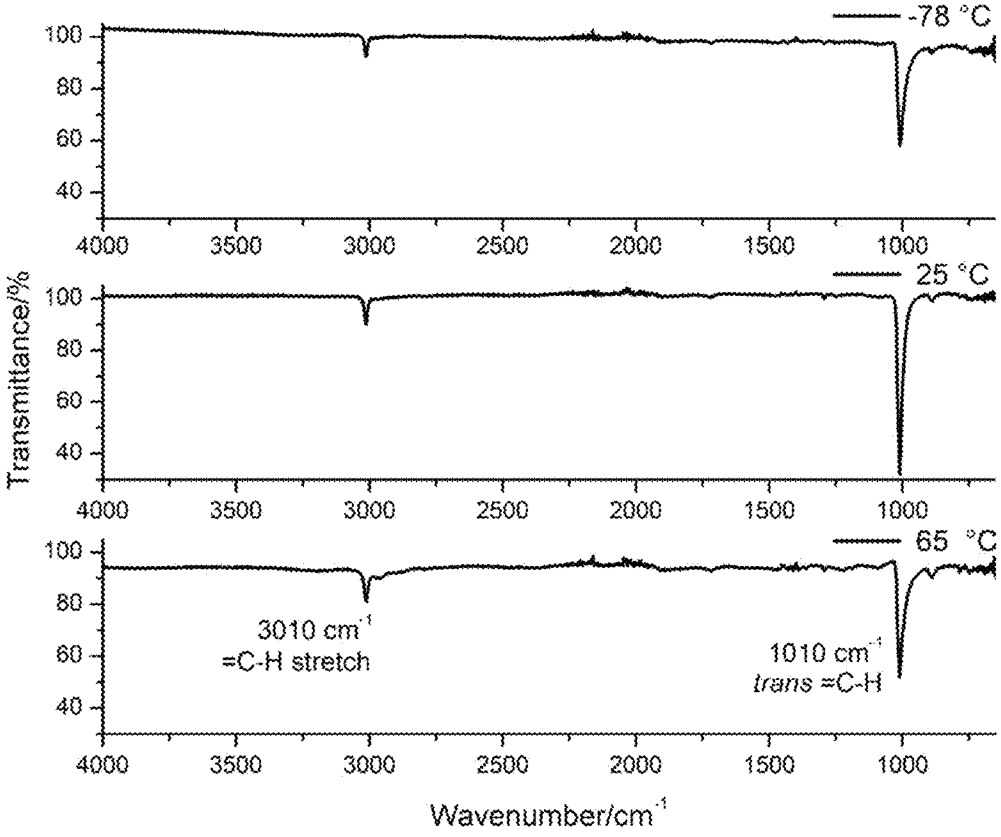
FIG. 1 shows an Infrared spectra (IR) of c-PA films produced at −78 °C (top), 25 °C (middle), and 65 °C (bottom).

Provided herein are cyclic polyacetylene (i.e., [N]annulene, wherein N is greater than 50), coated substrates comprising cyclic polyacetylene (c-PA), and methods of making cyclic polyacetylene.

In some cases, the cyclic polyacetylene can be a trans-cyclic polyacetylene, wherein the cyclic polyacetylene has at least 80% trans double bonds and at least 50 polymerized monomer units. As disclosed herein, this is the first cyclic polyacetylene ever reported to have at least 50 polymerized monomer units. Unlike related linear polyacetylene, the cyclic polyacetylene disclosed herein can be synthesized at temperatures as low as −94 °C and still comprise at least 80%, e.g., at least 90%, at least 95%, or at least 99% or more trans double bonds. The cyclic polyacetylene disclosed herein can have low crosslinking defects, such as less than 5% or even less than 1%. The low crosslinking defects can be seen by the highly conjugated cyclic polyacetylene described herein, wherein the average conjugation length can be at least 100. Further, the rate of polymerization of acetylene to form cyclic polyacetylene disclosed herein is high, wherein the rate of polymerization can be measured by the turnover frequency of the catalyst in the reaction with acetylene, for example, the initial rates for the turnover frequency can be 620,000 $g/mol_{cat}/h$. The conductivity of the cyclic polyacetylene disclosed herein after doping is high, for example, the conductivity can be 341 $ohm^{-1}cm^{-1}$. Despite the large size of the cyclic polyacetylene as disclosed herein, it can be soluble in certain solutions for a period of time if held at low temperatures, e.g., 0 °C, −20 °C, or −78 °C, unlike most linear polyacetylene. Cyclic polyacetylene that can be soluble is useful in industry for synthetic and processability purposes.

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

Cyclic Polyacetylene of the Disclosure

Provided herein are cyclic polyacetylenes having at least 50 polymerized monomer units. In some cases, the cyclic polyacetylene can be a trans-cyclic polyacetylene, wherein the cyclic polyacetylene has at least 80% trans double bonds. Optionally, the cyclic polyacetylenes can be modified to include polymeric side chains off the polyacetylene backbone.

As with any polymer, each individual cyclic polymer chain of the trans-cyclic polyacetylene can comprise a different amount of polymerized monomer units. As disclosed herein, the number of polymerized monomer units refers to the average amount of polymerized monomer units in a mixture of discrete trans-cyclic polyacetylene polymers. In embodiments, the trans-cyclic polyacetylene can have at least 50 polymerized monomer units. In embodiments, the trans-cyclic polyaceylene can have 50 to 100,000 polymerized monomer units, e.g., 100 to 100,000, 200 to 50,000, 100 to 50,000, or 50 to 50,000. In embodiments, the trans-cyclic polyacetylene can have at least 80 polymerized monomer units. In embodiments, the trans-cyclic polyacetylene can have at least 100 polymerized monomer units. For example, the trans-cyclic polyacetylene can have at least 100, at least 200, at least 300, at least 500, at least 1000, at least 1500, at least 2000, at least 5000, at least 10,000, at least 20,000, at least 25,000, or at least 50,000 polymerized monomer units.

In embodiments, the trans-cyclic polyacetylene can have at least 80% trans double bonds. For example, the trans-cyclic polyacetylene can have 80% to 99.9% trans double bonds, or 85% to 99.9% trans double bonds, or 90% to 99.9% trans double bonds, or 95% to 99.9% trans double bonds, such as, 80%, 85%, 90%, 91%, 92%, 93%, 94%, 95%, 96%, 97%, 98%, 99%, or 99.9% trans double bonds. In embodiments, the trans-cyclic polyacetylene can comprise a minor amount of cis double bonds, such as less than 1%. The number of trans double bonds in a cyclic polyacetylene can be assessed in a manner as described in the examples below.

The trans-cyclic polyacetylene disclosed herein has low crosslinking defects. In embodiments, the trans-cyclic polyacetylene can have less than 5% crosslinking defects. For example, the trans-cyclic polyacetylene can have less than 5%, 4%, 3%, 2%, 1%, 0.5%, or 0.1% crosslinking defects. In embodiments, trans-cyclic polyacetylene can have less than 2% crosslinking defects. In embodiments, the trans-cyclic polyacetylene can have less than 1% crosslinking defects. As used herein, the term "crosslinking defects" is defined as a covalent bond(s) that joins two or more distinct cyclic polymers together or more than one covalent bond that joins a discrete cyclic polymer to itself. The crosslinking defects in a cyclic polyacetylene can be assessed in a manner as described in the examples below.

In embodiments, the trans-cyclic polyacetylene can have an average conjugation length of at least 80. In some embodiments, the trans-cyclic polyacetylene can have an average conjugation length of at least 100. For example, the trans-cyclic polyacetylene can have an average conjugation length of 80, 90, 95, 100, 105, 110, 115, 120, 130, 150, 200 or more. As used herein, the term "average conjugation length" is defined as the average number of uninterrupted π-bonds in a conjugated system, such as the trans-cyclic polyacetylene. The average conjugation length in a cyclic polyacetylene can be assessed in a manner as described in the examples below.

In some embodiments, the trans-cyclic polyacetylene can further comprise a dopant. In embodiments, the dopant can be a p-type dopant or n-type dopant. In embodiments, the dopant can be bromine, iodine, chlorine, inter halogens (e.g., ICl, IBr) $AsF_5$, $SbF_6$, $SbCl_6$, $HClO_4$, $H_2SO_4$, $(NO)(PF_6)$, $Ag(ClO_4)$, lithium, sodium, potassium, or a combination thereof. For example, the trans-cyclic polyacetylene can be doped with a dopant to improve the electrical conductivity of the trans-cyclic polyacetylene. In embodiments, the dopant can improve the conductivity of the trans-cyclic polyacetylene by orders of magnitude.

In embodiments wherein the trans-cyclic polyacetylene is doped with a dopant, the trans-cyclic polyacetylene can have a conductivity of at least 10 $ohm^{-1}$'$cm^{-1}$. In embodiments, the trans-cyclic polyacetylene can have a conductivity of at least 100 $ohm^{-1}cm^{-1}$. In embodiments, the trans-cyclic polyacetylene can have a conductivity of at least 200 $ohm^{-1}cm^{-1}$. In embodiments, the trans-cyclic polyacetylene can have a conductivity of at least 300 $ohm^{-1}cm^{-1}$. For example, the trans-cyclic polyacetylene can have a conductivity of at least 100 $ohm^{-1}cm^{-1}$, such as 100 $ohm^{-1}cm^{-1}$, 150 $ohm^{-1}cm^{-1}$, 200 $ohm^{-1}cm^{-1}$, 250 $ohm^{-1}cm^{-1}$, 300 $ohm^{-1}cm^{-1}$, 320 $ohm^{-1}cm^{-1}$, 340 $ohm^{-1}cm^{-1}$, or 350 $ohm^{-1}cm^{-1}$ or more. In some cases, the conductivity can be to up 10,000 $ohm^{-1}cm^{-1}$. Conductivity of a cyclic polyacetylene can be assessed in a manner as described in the examples below.

The trans-cyclic polyacetylene described herein can be prepared by the method of preparing a cyclic polyacetylene as described below.

Further provided herein are coated substrates comprising the trans-cyclic polyacetylene disclosed herein and a substrate. In embodiments, the trans-cyclic polyacetylene is coated on the substrate as a film. In embodiments, the trans-cyclic polyacetylene coating can be 1 μm thick or more, such as 1 μm to 1 mm, or 1 μm to 500 μm, or 1 μm to 100 μm, or 10 μm to 500 μm, or 10 μm to 100 μm, for example, 1 μm, 2 μm, 3 μm, 4 μm, 5 μm, 10 μm, 15 μm, 20 μm, 50 μm, 100 μm, 200 μm, 500 μm, or 1 mm or more. In embodiments, the substrate can comprise a metal, a polymer, silicon, a plastic, wood, glass, or a combination thereof. In embodiments, the substrate can be an electric device, a battery, a solar cell, or a sensor. For example, the substrate can be an organic solar cell, an electronic circuit, an organic light-emitting diodes, a transistor, an actuator, a supercapacitor, a chemical sensor and/or biosensor, a flexible transparent display, or the like. In embodiments, the trans-cyclic polyacetylene coating can be free-standing on the substrate. As used herein, the term "free-standing" refers to the trans-cyclic polyacetylene coating not being bound to the substrate.

Further provided herein are derivatives of trans-cyclic polyacetylene disclosed herein, such as, a cyclic bottlebrush polymer. For example, the cyclic bottlebrush polymer can be a cyclic polyacetylene with a plurality of polystyrene branches off of the polyacetylene backbone. As used herein, the term "bottlebrush polymer" or "bottlebrush," also known as "molecular brush," are macromolecules having a plurality of polymeric side-chains. In embodiments, a cyclic bottlebrush polymer includes a cyclic backbone polymer, wherein the backbone polymer is cyclic prior to the addition of the polymeric side-chains and remains cyclic after the addition of the polymeric side-chains. In embodiments, cyclic polyacetylene can be modified to include a halogen, wherein the halogen can include one or more of F, Cl, Br, and I. In embodiments, the halogen containing cyclic polyacetylene can be modified to include a plurality of polymeric side chains. In embodiments, the cyclic bottlebrush polymer can include the trans-cyclic polyacetylene as disclosed herein as the cyclic backbone. In embodiments, the polymer side-chains of the cyclic bottlebrush polymer can be prepared from one of more types of vinyl monomers, such as styrene or butyl-acrylate. In embodiments, the cyclic bottlebrush polymer can include polystyrene side-chains. In embodiments, the cyclic bottlebrush polymer can include poly(butylacrylate) side-chains.

Method of Preparing the Cyclic Polyacetylene of the Disclosure

Provided herein are methods of preparing a cyclic polyacetylene, the method can include admixing acetylene and a metal-alkylidene catalyst under conditions sufficient to polymerize the acetylene to form the cyclic polyacetylene. In embodiments, the cyclic polyacetylene can be a trans-cyclic polyacetylene, wherein trans-cyclic polyacetylene has at least 80% trans double bonds. In embodiments, the metal-alkylidene catalyst can have a structure represented by formula (1):

(1)

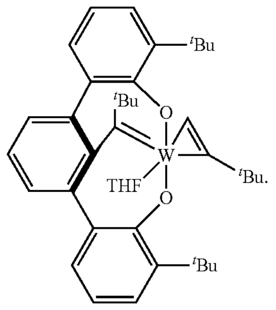

As used herein, the term "acetylene" refers to a compound having the structure of

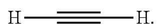

In embodiments, the admixing can comprise contacting the acetylene with a catalyst solution of the catalyst and a solvent. Examples of solvents that may be used in the polymerization reaction include organic solvents that are inert under the polymerization conditions. In embodiments, the solvent be an aprotic solvent. In embodiments, the aprotic solvent can be aliphatic hydrocarbons, aromatic hydrocarbons, heteroaryls, ethers, halogenate hydrocarbons, or a combination thereof. For example, the aprotic solvent can be dichloromethane, tetrahydrofuran, ethyl acetate, diethyl ether, 1,4-dioxane, chloroform, pentane, hexane, benzene, pyridine, toluene, or a combination thereof. In embodiments, the admixing does not include a protic or aqueous solvent. In embodiments, the catalyst can have a concentration in the catalyst solution of 0.001 mg/mL or more. For example, the catalyst can have a concentration in the catalyst solution of 0.01 mg/mL to 100 mg/mL, or 0.1 mg/mL to 75 mg/mL, or 0.1 mg/mL to 50 mg/mL, or 0.5 mg/mL to 50 mg/mL, or 1 mg/mL to 50 mg/mL, or 1 mg/mL to 25 mg/mL, or 0.1 mg/mL to 25 mg/mL, or 1 mg/mL to 10 mg/mL, such as, 0.01 mg/mL, 0.1 mg/mL, 0.5 mg/mL, 1 mg/mL, 2 mg/mL, 3 mg/mL, 4 mg/mL, 5 mg/mL, 6 mg/mL, 7 mg/mL, 8 mg/mL, 9 mg/mL, 10 mg/mL, 20 mg/mL, 25 mg/mL, 50 mg/mL, 75 mg/mL, 100 mg/mL.

In some embodiments, the catalyst is present in methods disclosed herein a manner other than as a catalyst solution. In embodiments, the catalyst can be a powder. In embodiments, the catalyst can be coated on a substrate. In embodiments, the substrate can comprise a metal, a polymer, silicon, a plastic, or wood. In embodiments, the catalyst can be coated on the substrate by solvent casting, spinning coating, dip coating, drop coating, or a combination thereof.

In embodiments, the admixing can comprise contacting the catalyst with an acetylene solution comprising acetylene and a solvent. In embodiments, the solvent be an aprotic solvent. In embodiments, the aprotic solvent can be as described above. In embodiments, the admixing of catalyst and acetylene is not in the presence of a protic or aqueous solvent. In embodiments, the acetylene can have any concentration in the acetylene solution up to and including saturation of the acetylene in the solution. In embodiments, the acetylene can have a concentration in the acetylene solution of 0.1 mg/mL or more, up to the saturation point of the acetylene solution. For example, the acetylene can have a concentration in the acetylene solution of 0.1 mg/mL to 19 mg/mL, or 0.1 mg/mL to 10 mg/mL, or 0.1 mg/mL to 5 mg/mL, or 0.5 mg/mL to 19 mg/mL, or 1 mg/mL to 19 mg/mL, or 1 mg/mL to 10 mg/mL, or 0.1 mg/mL to 1 mg/mL, such as, 0.1 mg/mL, 0.2 mg/mL, 0.5 mg/mL, 1 mg/mL, 2 mg/mL, 3 mg/mL, 4 mg/mL, 5 mg/mL, 6 mg/mL, 7 mg/mL, 8 mg/mL, 9 mg/mL, 10 mg/mL, 15 mg/mL, 20 mg/mL.

In embodiments, the admixing can comprise contacting acetylene gas with the catalyst. In embodiments, the acetylene gas can be pure acetylene gas (e.g., having less than 0.5 mol % of other components present) or can include another component in the acetylene gas. The other component can include aprotic solvents as described above, such as acetone. In embodiments, the acetylene gas can be flowed over the catalyst solution as described herein. In embodiments, the acetylene gas can be flowed over the catalyst-coated substrate such that the trans-cyclic polyacetylene forms as a film on the substrate.

In embodiments, the admixing can comprise contacting the acetylene with the catalyst via interfacial polymerization. In embodiments, the interfacial polymerization can include a first phase and a second phase. The first phase and second phase can be solids, liquids or gases. In embodiments, the first phase can comprise acetylene gas or an acetylene solution as described herein. The second phase can be a catalyst solution as described herein, the catalyst as a powder (solid), or a catalyst-coated on a substrate (solid) as described herein.

In embodiments wherein the admixing comprises contacting acetylene with the catalyst-coated substrate via interfacial polymerization, the trans-cyclic polyacetylene can be formed as a film that is continually drawn off the interface of a catalyst solution and acetylene gas.

The admixing of acetylene and a catalyst described herein can be performed at a temperature of −100 °C to 110 °C. In embodiments, the admixing can be performed at a temperature of −78 °C to 100 °C, or −78 °C to 80 °C, or −78 °C to 65 °C, or −20 °C to 65 °C., such as at a temperature of −78 °C, −70 °C, −50 °C, −25 °C, −20 °C, −10 °C, 0 °C, 10 °C., 20 °C, 25 °C, 40 °C, 50 °C, 60 °C, 65 °C, 75 °C, 80 °C, or 100 °C. In embodiments, the admixing can be performed wherein the temperature changes throughout the reaction. Advantageously, the admixing can be performed at a temperature as low as −94 °C and the trans-cyclic polyacetylene formed comprises at least 90% trans double bonds, or at least 95% trans double bonds, or at least 98% trans double bonds. Further, advantageously, the admixing can be performed at a temperature as low as −94 °C and the trans-cyclic polyacetylene formed comprises less than 5% crosslinking defects, or less than 2% crosslinking defects, or less than 1% crosslinking defects.

The admixing of acetylene and a catalyst described herein can be performed at a pressure of 0.01 atm to 2 atm. For example, the pressure can be 0.1 atm to 2 atm, or 0.5 atm to 2 atm, or 0.5 atm to 1.5 atm, such as, 0.1 atm, 0.2 atm, 0.3 atm, 0.4 atm, 0.5 atm, 0.6 atm, 0.7 atm, 0.8 atm, 0.9 atm, 1 atm, 1.5 atm, or 2 atm. In various cases, the methods disclosed herein are performed at atmospheric pressure.

The admixing of acetylene and a catalyst described herein can be performed in the absence of $O_2$, $CO_2$, and $H_2O$. In embodiments, the admixing is performed under inert gas. The inert gas can comprise $N_2$, Ar, Ne, Kr, or Xe.

In embodiments wherein the admixing comprises contacting an acetylene solution described herein and a catalyst solution described herein, the trans-cyclic polyacetylene product formed can be temporarily soluble in the combined solutions. As used herein, and unless specified otherwise, the term "temporarily soluble" refers to a material being soluble in a given solution and at a given temperature for at least one minute before precipitating from the solution. The trans-cyclic polyacetylene product formed can be soluble in the combined solutions for at least 1 minute. In embodiments, the trans-cyclic polyacetylene product formed can be soluble in the combined solutions for 1 minute to 5 hours, or 5 minutes to 3 hours, or 10 minutes to 1 hour, such as, 1 minute, 5 minutes, 10 minutes, 15 minutes, 30 minutes, 45 minutes, 1 hour, 2 hours, 3 hours, 4 hours, or 5 hours. In embodiments wherein the trans-cyclic polyacetylene product formed can be temporarily soluble in the combined solutions, the acetylene solution can be dilute and/or the catalyst solution can be dilute. In embodiments, the trans-cyclic polyacetylene product formed can be soluble in the combined solutions for at least one minute, when the temperature of the combined solutions is −50 °C or higher, such as, −40 °C, −30 °C, −20 °C, −10 °C, 0 °C, 10 °C, 20 °C, 25 °C, 30 °C or higher, 50 °C or higher, 75 °C or higher, or 100 °C or higher. In embodiments, the trans-cyclic polyacetylene product formed can be temporarily soluble at a temperature of about −20 °C or higher. In embodiments, the trans-cyclic polyacetylene product formed can be soluble in the combined solutions for 1 minute to 5 hours, or 5 minutes to 3 hours, or 10 minutes to 1 hour, such as, 1 minute, 5 minutes, 10 minutes, 15 minutes, 30 minutes, 45 minutes, 1 hour, 2 hours, 3 hours, 4 hours, or 5 hours, when the temperature of the combined solutions is −50 °C or higher, such as, −40 °C, −30 °C, −20 °C, −10 °C, 0 °C, 10 °C, 20 °C, 25 °C, 30 °C or higher, 50 °C or higher, 75 °C or higher, or 100 °C or higher. The concentration of the dilute acetylene solution can be 0.005 mM, 0.01 mM, 0.02 mM, 0.05 mM, or 0.1 mM. . The concentration of the dilute catalyst solution can be 0.05 mM, 0.1 mM, 0.2 mM, 0.5 mM, 1.0 mM, or 5.0 mM.

The method of preparing trans-cyclic polyacetylene herein can have a high rate of polymerization, such as an initial turnover frequency of 620,000 g/$mol_{cat}$/h. In embodiments, the catalyst having the structure of formula (I) has an initial turnover frequency of at least 200,000 g/$mol_{cat}$/h. For example, the catalyst having the structure of formula (I) has an initial turnover frequency of 200,000 g/$mol_{cat}$/h to 700,000 g/$mol_{cat}$/h, or 300,000 g/$mol_{cat}$/h to 650,000 g/$mol_{cat}$/h, or 400,000 g/$mol_{cat}$/h to 700,000 g/$mol_{cat}$/h, such as 200,000 g/$mol_{cat}$/h, 250,000 g/$mol_{cat}$/h, 300,000 g/$mol_{cat}$/h, 400,000 g/$mol_{cat}$/h, 500,000 g/$mol_{cat}$/h, 600,000 g/$mol_{cat}$/h, or 620,000 g/$mol_{cat}$/h.

EXAMPLES

Materials and Methods

Unless specified otherwise, all manipulations were performed under an inert atmosphere using glovebox or Schlenk line techniques. Tetrahydrofuran (THF) and toluene were dried using a GlassContour drying column. Acetylene was purchased from Airgas, passed through a cold trap of acetone and dry ice, a column of activated carbon and 3 Å sieves prior to use. Catalyst 1 was prepared according to literature procedures (Veige et al., Nature Chemistry 2016, 8 (8), 791-796). Titanium(IV) butoxide and triethylaluminum solution 25wt % in toluene were used as purchased from Sigma-Aldrich. Magic-angle spinning experiments were carried out on a Bruker 600 MHz Avance III spectrometer equipped with a 4 mm Bruker H/BB probe tuned to $^{1}H/^{13}C$. Samples were packed into zirconia rotors with Kel-F drive caps for experiments below 60 °C and macor drive caps for experiments above 60 °C. $^{13}C$ (150.92 MHz) NMR spectra were collected utilizing either $^{1}H$ -$^{13}C$ Cross Polarization (CP) or $^{13}C$ single-pulse experiments. CP was accomplished with a 2.4 μs $^{1}H$ π/2 pulse followed by 1.9-ms ramped CP with a constant 55 kHz ($^{13}C$) RF field. $^{13}C$ one-pulse experiments used a 5.6 us $^{13}C$ π/2 pulse. $^{1}H$ decoupling of 86 kHz of $^{1}H$ (600.13 MHz) decoupling was employed during 40-ms of signal acquisition. $^{13}C$ spectra were referenced externally with adamantane by setting the downfield resonance to 38.48 ppm. Cryo UV-vis spectra were obtained on a Cary 50 spectrophotometer, equipped with a temperature-controlled Unisoku single-cell accessory (±0.1 °C). The measurements were performed in Schlenk-adapted cuvettes with a 1 cm optical path length. Fourier transform infrared spectroscopies were done using Cary 630 FTIR (Agilent Technologies, Santa Clara, CA, USA). The Raman spectroscopies were recorded on a Horiba Aramis Raman system with a 10× object lens. Lasers with wavelengths of 633 nm and 785 nm and 600 g/mm and 1800 g/mm gratings were used. Scanning electron microscope (SEM) images were obtained on a Tescan MIRA3 scanning electron microscope. The operating voltage ranged from 0.2 to 30 keV with a Schottky field emission gun ZrO/W source. Energy dispersive X-ray spectroscopies (EDS) were collected using EDAX Octane Pro energy dispersive spectroscopy (EDS) system. The sheet resistivities of the films were measured on a Signatone Pro4-4400 4-point probe station equipped with a Keithley 2400 source meter. The thickness was measured using a profilometer.

Example 1-Synthesis Of Trans-Cyclic Polyacetylene

Figure 8:
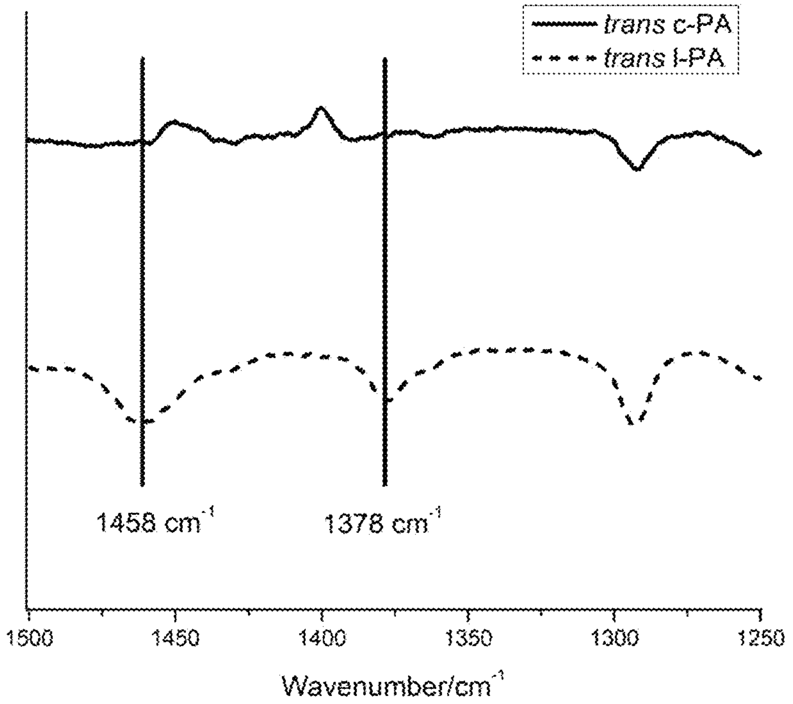
FIG. 8 shows a zoomed-in IR spectroscopies of c-PA (top) and l-PA (bottom).
Figure 9:
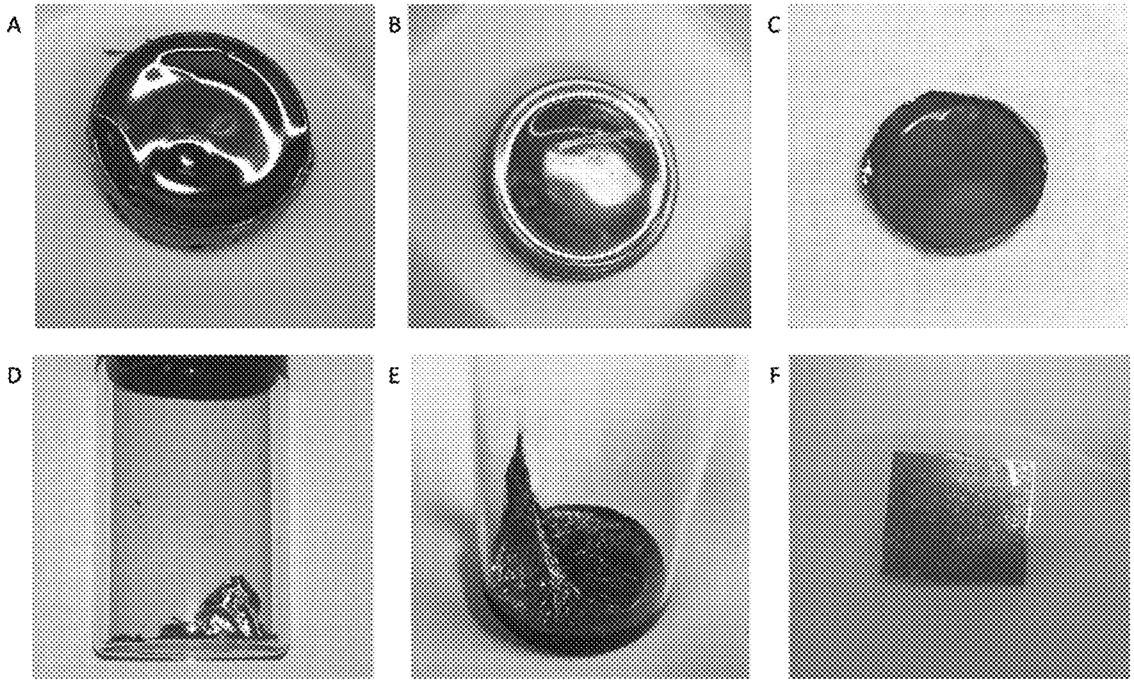
FIG. 9 shows photographs of c-PA films; (A) and (B) shiny side of two c-PA films synthesized at 25 °C; (C) Dull side of c-PA film synthesized at 25 °C; (D) c-PA film synthesized at −78 °C; (E) thin, flexible c-PA film formed on the surface of the thin catalyst solution layer at 65 °C; (F) Coating the catalyst on a Si plate and introduce acetylene coats a thin layer of c-PA film on the plate.
Figure 10:
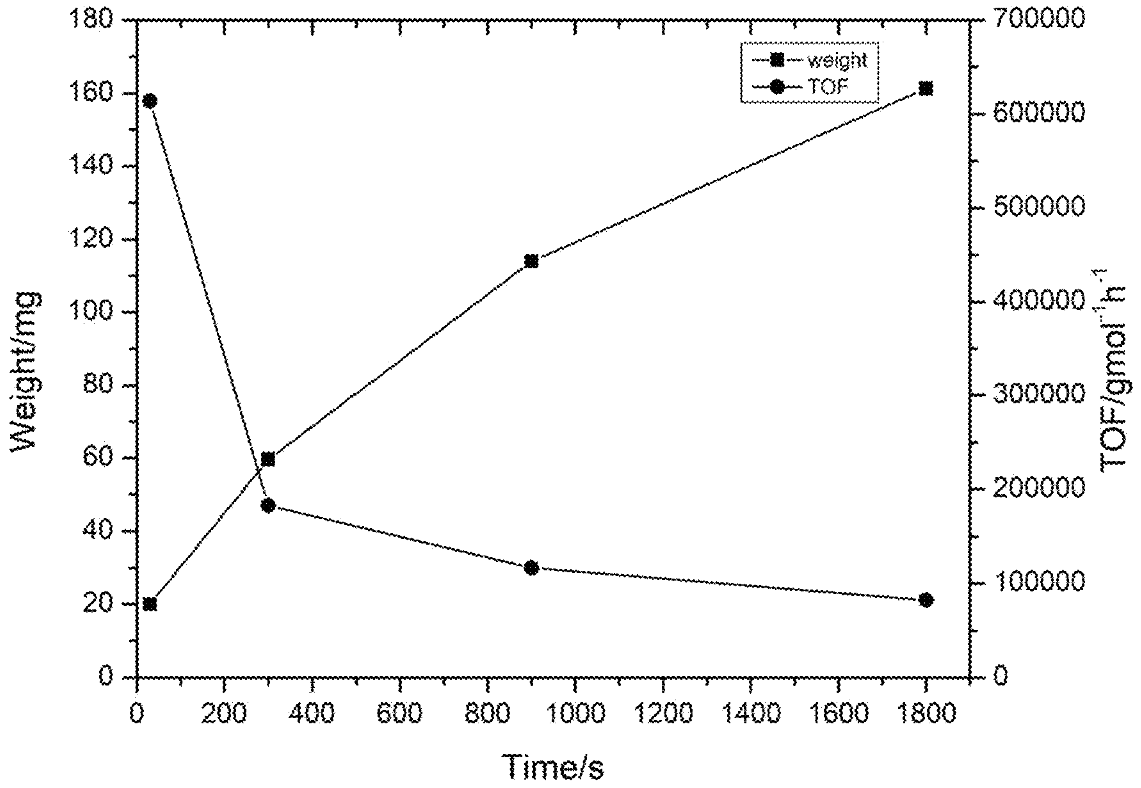
FIG. 10 shows a graph of the weights of c-PA produced and turn-over-frequency (TOF) with different reaction time.
Figure 11A:
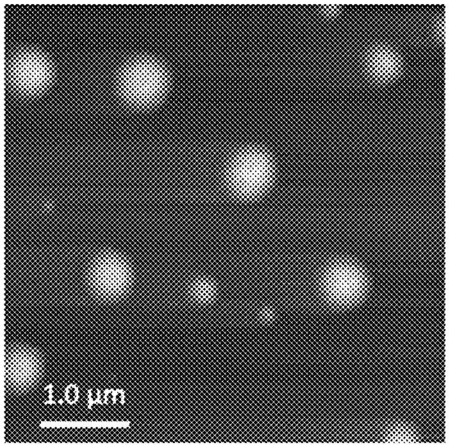
FIG. 11A-11F show atomic force microscopy (AFM) photographic images of cyclic bottlebrush polymers as disclosed herein.
Figure 11B:
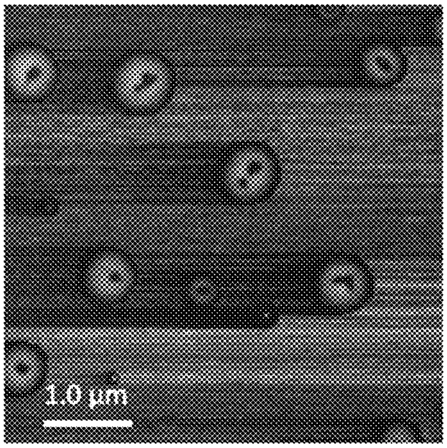
Figure 11C:
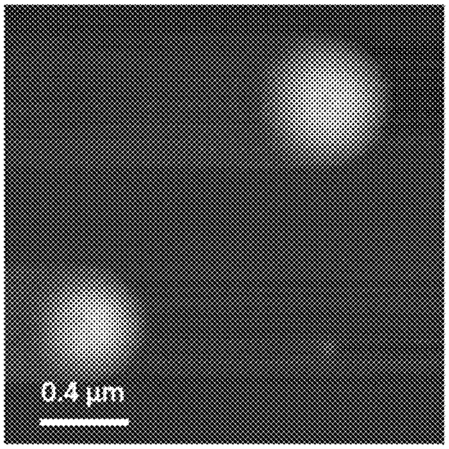
Figure 11D:
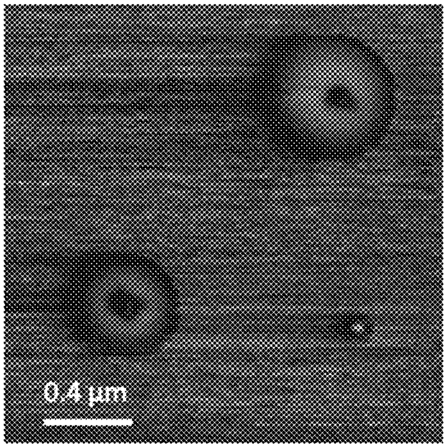
Figure 11E:
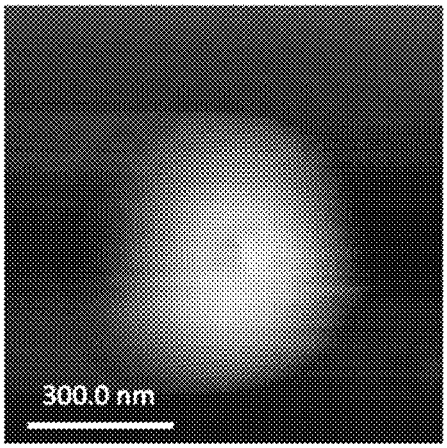
Figure 11F:
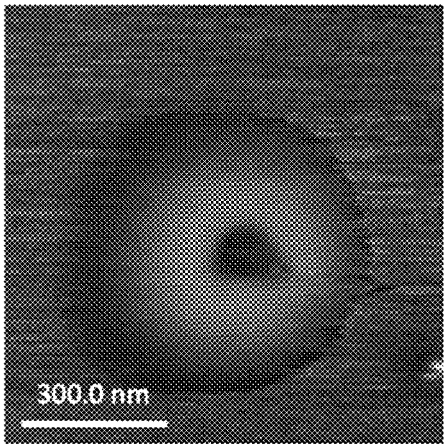

General Method-Injecting a toluene solution (5 mg/mL) of catalyst 1 (400 μL) into a 10 mL of acetylene saturated toluene solution at temperatures ranging from −94 °C to 65 °C produced c-PA as a black viscous gel that converted to a black powder after removing all volatiles and washing with pentane and THF. The formation of c-PA was instantaneous upon exposing acetylene to catalyst 1 with a measured initial TOF of 620,000 g/$mol_{cat}$/h (FIG. 10). Alternatively, exposing a vial coated with a 400 μL toluene solution containing catalyst 1 (5 mg/mL) with an atmosphere of acetylene for 15 min at different temperatures ranging from −78 °C to 65 °C produced free standing flexible and silvery films of c-PA (FIG. 9). Also, injecting a dilute THF solution of 1 into a highly dilute acetylene/THF solution at −20 °C produced temporarily soluble c-PA. All the methods, at all temperatures ranging from −94 °C to 65 °C always gave exclusively polyacetylene material comprising >99% trans double bonds as confirmed by IR spectroscopy (FIG. 1, FIG. 10). FIG. 1 depicted the infrared spectra of thin films of c-PA produced at −78 °C (top), 25 °C (middle), and 65 °C (bottom). Remarkably clean IR spectra, the important features were the strong =C—H out of plane bending at 1010 $cm^{-1}$ and the weak =C—H stretching vibration at 3010 $cm^{-1}$. Importantly, the IR spectrum of c-PA did not exhibit terminal $CH_2$ or $CH_3$ stretches at 1458 $cm^{-1}$ and 1378 $cm^{-1}$ that were observed in the linear samples prepared using $Ti(O^{t}Bu)_4$/$AlEt_3$ (FIG. 8).

Synthesis of trans-cyclic polyacetylene as a powder—In a 50 mL 2-neck round bottom flask equipped with a stir bar, 10 mL toluene was added. The 2-neck round bottom flask was then capped with a Y-adapter and a septum. The Y-adapter was connected to the Schlenk line and the setup was then kept under argon flow and in controlled temperature baths (dry ice/acetone, −78 °C; oil bath, 65 °C). The argon flow was stopped before introducing acetylene gas. Bubbling acetylene gas into toluene for 5 minutes with the stir on using a needle after passing through a cold trap and a column gave a saturated acetylene/toluene solution. Addition of 400 μL toluene solution of 1 (5.0 mg/mL) using an air-tight syringe initiated the polymerization. The solution turned black and black powder precipitated immediately after the injection of the catalyst solution. Some black solids even formed from the needle tip into the solution as a black string when the catalyst solution was being injected into the round bottom flask. Leaving the acetylene gas on for 15 minutes gave a black viscous solution/suspension. After acetylene gas was removed, the whole setup was purged with argon for 3 minutes and taken into the glovebox. Pulling toluene off gave black powders. Washing the powders with THF and pentane until the resulting solutions were colorless and drying the resulting powders under dynamic vacuum produced cyclic trans-polyacetylene as black powders (160.5 mg). FTIR: 3010 $cm^{-1}$, =C—H stretch; 1010 $cm^{-1}$, trans =C—H out of plan bending.

Synthesis of solution phase trans-cyclic polyacetylene—In a dry nitrogen filled glovebox, a 20 mL vial was filled with 5 mL THF to and then was capped with a septum and taken out of the glovebox. Bubbling acetylene gas into the THF for 5 min gave an acetylene saturated THF solution and the vial was then taken into the glovebox. Adding 50 μL of solution 1 in THF (0.5 mg/mL) to the saturated acetylene/THF solution at ambient temperature produced black precipitates immediately. Diluting the saturated solution to lower than 0.1 mM and cooling it down to in the range of −78 °C to 0 °C slowed down the polymerization. The color turned from light yellow (catalyst solution) to orange, red, purple and dark blue, then eventually a black precipitate. The rate varied depending on the concentrations and polymerization temperature.

Synthesis of trans-cyclic polyacetylene as a film at different temperatures—In a 20 mL vial, 400 μL of solution 1 in toluene (5.0 mg/mL) was evenly coated at the bottom to form a yellow, thin layer of the catalyst solution. The vial was then capped with a septum and taken out of the glovebox. Acetylene gas was introduced through a needle after passing through a cold trap and a column with an outlet needle on the septum. The yellow catalyst solution turned black immediately and a shiny metallic film formed. The acetylene gas was left running for 15 minutes before the outlet needle and acetylene needle were removed. The vial was then purged with argon for 3 minutes before taken into the glovebox. The film was wet with THF and peeled off from the bottom of the vial. The polyacetylene film was then washed with THF and pentane several times before the resulting solutions turned colorless. The film was dried under dynamic vacuum to yield cyclic trans-polyacetylene as a metallic film. (45.0 mg) FTIR: 3010 $cm^{-1}$, ═C—H stretch; 1010 $cm^{-1}$, trans ═C—H out of plan bending. The transmittance for trans ═C—H was 33.97% and 99.47% for cis ═C—H (at 747 $cm^{-1}$). The cis/trans ratio was calculated to be 0.64%, as cis %=$1.3A_{cis}/(1.3A_{cis}+A_{trans})$ (Ito et al., *Journal of Polymer Science Part a-Polymer Chemistry* 1974, 12 (1), 11-20).

Keeping the vial with catalyst in dry ice/acetone bath for 15 min before the acetylene gas exposure and keeping the vial in dry ice/acetone bath during the polymerization gave a polyacetylene film made at −78 °C. Heating the vial with catalyst and keeping the polymerization at 65 °C gave a polyacetylene film synthesized at 65 °C. FIG. 1 depicts the IR of the films synthesized at different temperatures.

Example 2—Characterization of C-PA

Figure 2:
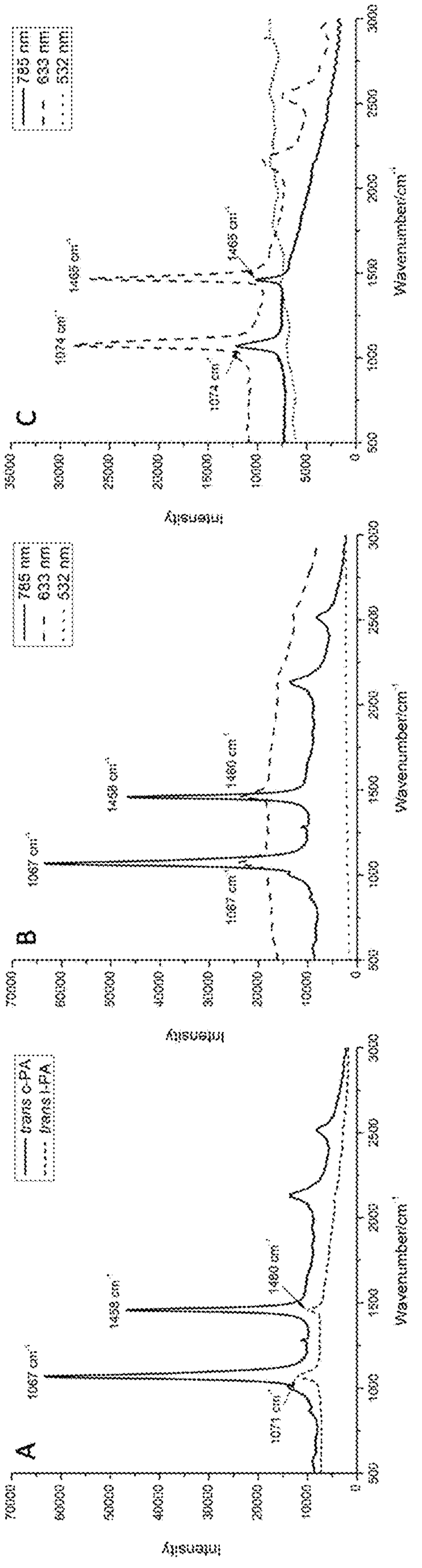
FIG. 2 shows a Raman spectra of trans-transoid cyclic polyacetylene films prepared from catalyst 1 at 25 °C and trans-transoid linear polyacetylene prepared from $Ti(O^tBu)_4/AlEt_3$ at 25 °C then isomerized at 180 °C; (A) Raman spectra of c-PA and l-PA both excited at 785 nm; (B) Raman spectra of c-PA excited at 785 nm, 633 nm, and 532 nm; (C) Raman spectra of l-PA excited at 785 nm, 633 nm, and 532 nm .

Raman Spectroscopy—Different excitation lasers with wavelength of 785 nm, 633 nm, and 532 nm were used. FIG. 2 depicts the Raman spectra of cyclic and linear polyacetylene respectively with filter number of 0.6, a hole size of 200 μm, 600 g/mm grating type, 1 second continuous mode time, and 1 second snapshot time under 785 nm laser.

Alternating double and single bonds in trans-transoid form were expected for cyclic polyacetylene. Raman spectra of c-PA prepared as thin films from catalyst 1 featured the expected C—C stretch at 1067 $cm^{-1}$ and C═C stretch at 1458 $cm^{-1}$ (excitation wavelength 785 nm). Using the same excitation wavelength of 785 nm Xia et al produced a PA film with an observed frequency at 1463 $cm^{-1}$ (Xia et al., Science 2017, 357, 475-478). According to Ikeda and Shirakawa et al, a C═C stretching vibration at 1466 $cm^{-1}$ (excitation wavelength 676.4 nm) corresponds to a conjugation length upper limit of ≥100 (Shirakawa et al., *Polym J* 1971, 2, 231-244). Considering samples produced by 1 exhibited a red-shifted Raman frequency at 1466 $cm^{-1}$ using low energy excitation implied a much greater average conjugation length than films produced using the Ti catalyst. In fact, thin films of linear trans-transoid polyacetylene (l-PA) synthesized using Shirakawa's method in our labs produced minimal absorption when excited at 785 nm (FIG. 2A). Considering the inconclusive studies on polyacetylene spectroscopies due to polydispersity, inhomogeneity, and coexistence of ordered and disordered phases, c-PA exhibiting intense sharp peak at 1458 $cm^{-1}$ when excited at 785 nm were among the lowest sharp resonances observed (Mulazzi et al., *Solid State Communications* 1983, 46, 851-855; Arakawa et al., Chem. Lett. 1984, 1637-1640), suggesting it was the most conjugated PA produced to date. Moreover, no absorption results in excitation at 532 $cm^{-1}$ and excitation at 633 nm resulted in significantly reduced absorption, no change in shape, and no significant change in frequency (1460 $cm^{-1}$), thus suggesting c-PA produced by 1 had a narrow distribution of conjugation lengths.

UV-vis Absorption—Transferring 50 μL of the acetylene saturated THF solution to a cuvette and diluting to 3.00 mL gave a diluted acetylene/THF solution as the monomer solution. The cuvette was then capped, taken into a cryo-UV-vis and cooled down to −20 °C. A background UV-vis was taken for the monomer solution. Adding 50 μL of solution 1 in THF (0.5 mg/mL) to the cuvette via an air-tight syringe initiated the polymerization. UV-vis spectra were recorded every 1 min after the injection of the catalyst for 2 h and then every 2 min after 2 h for 3 h.

Figure 3:
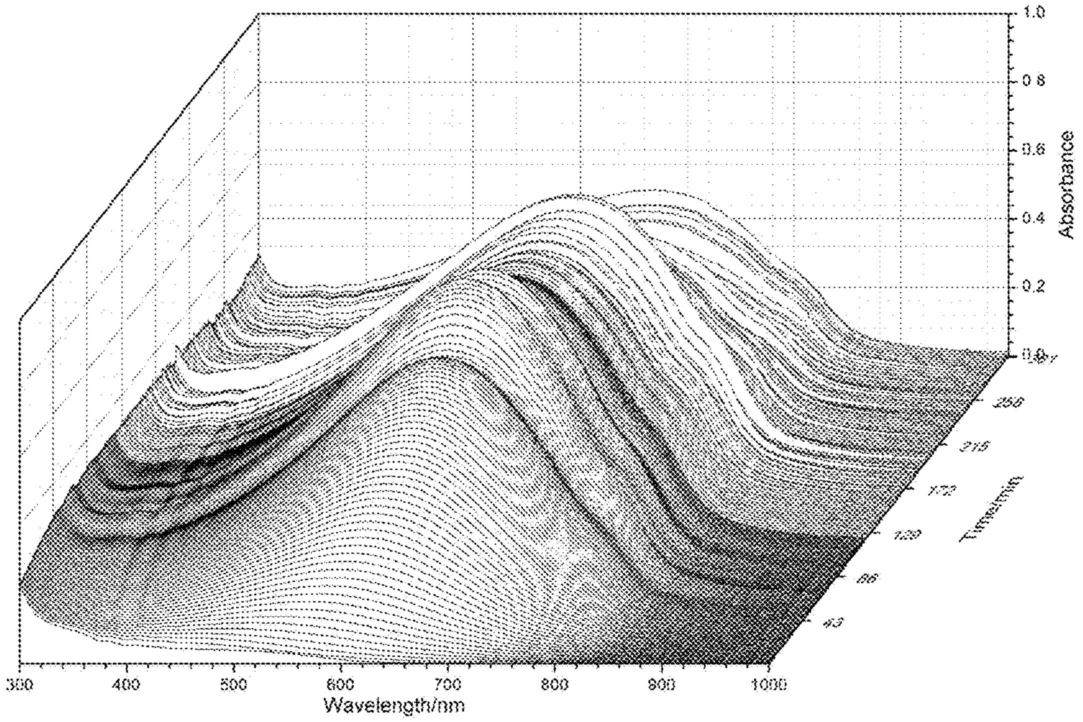
FIG. 3 shows a UV-vis spectroscopy monitoring the formation of c-PA. UV-vis spectroscopies recorded during polymerization of acetylene with catalyst 1 in THF at −20 °C for 5 h.
Figure 4:
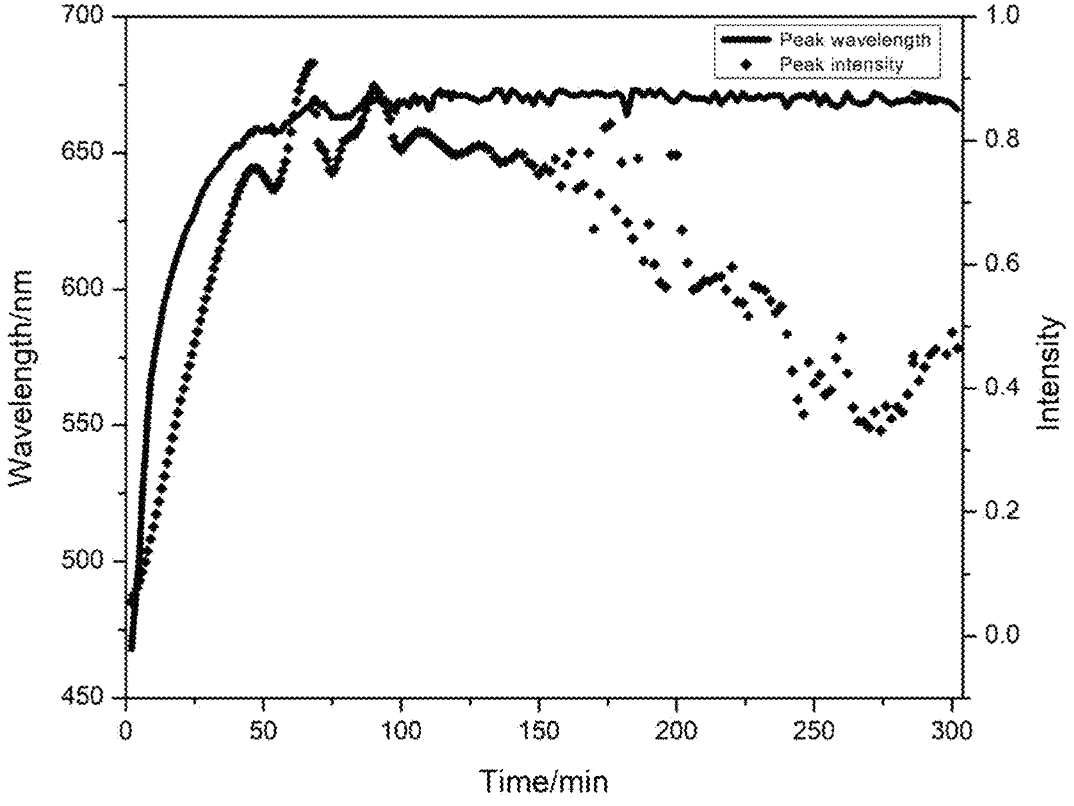
FIG. 4 UV-vis spectroscopy monitoring the formation of c-PA. Plotting the peak wavelength $\lambda_{max}$ and the peak intensity during the polymerization against the polymerization time.

Complementing the Raman data, the UV-vis absorption data also suggested the c-PA produced by catalyst 1 was highly conjugated. Moreover, the growth of conjugation length was directly observable via UV-vis spectroscopy. Notoriously insoluble, only a few experiments directly measure the UV-vis absorption of soluble PA. Xia et al. produced PA via sonication and the polymer exhibited a $\lambda_{max}$ at 636 nm (Xia et al., *Science* 2017, 357, 475-478), Grubbs' ring opening of substituted-COT produced substituted PA with a range of $\lambda_{max}$ between 302-634 nm (Grubbs et al., J. Am. Chem. Soc. 1993, 115, 1397-1409). c-PA synthesized with 1 at −20 °C under dilute conditions was soluble for ~1 h. FIG. 3 depicts the temporal UV-vis spectra of c-PA and FIG. 4 depicts the $\lambda_{max}$ and peak intensity over 5 h. In the first 1 h, the increase in both $\lambda_{max}$ and intensity suggested the continuous formation of c-PA and the increase in conjugation length. After 47 min, the peak intensity started to fluctuate and gradually decreased after 67 min as c-PA started to precipitate. The $\lambda_{max}$ reaches max at 670 nm at 67 min with an onset at 950 nm, the longest solution phase absorption recorded, marked the most conjugated PA in solution phase. Xia observed a blue shift as PA started to precipitate from solution (Xia et al., *Science* 2017, 357, 475-478). However, as high content of c-PA started to precipitate after 67 min, the $\lambda_{max}$ stayed around 670 nm with no significant hypsochromic shift observed while the peak intensity decreases, suggested c-PA maintains its high conjugation as it precipitates from solution.

Figure 5:
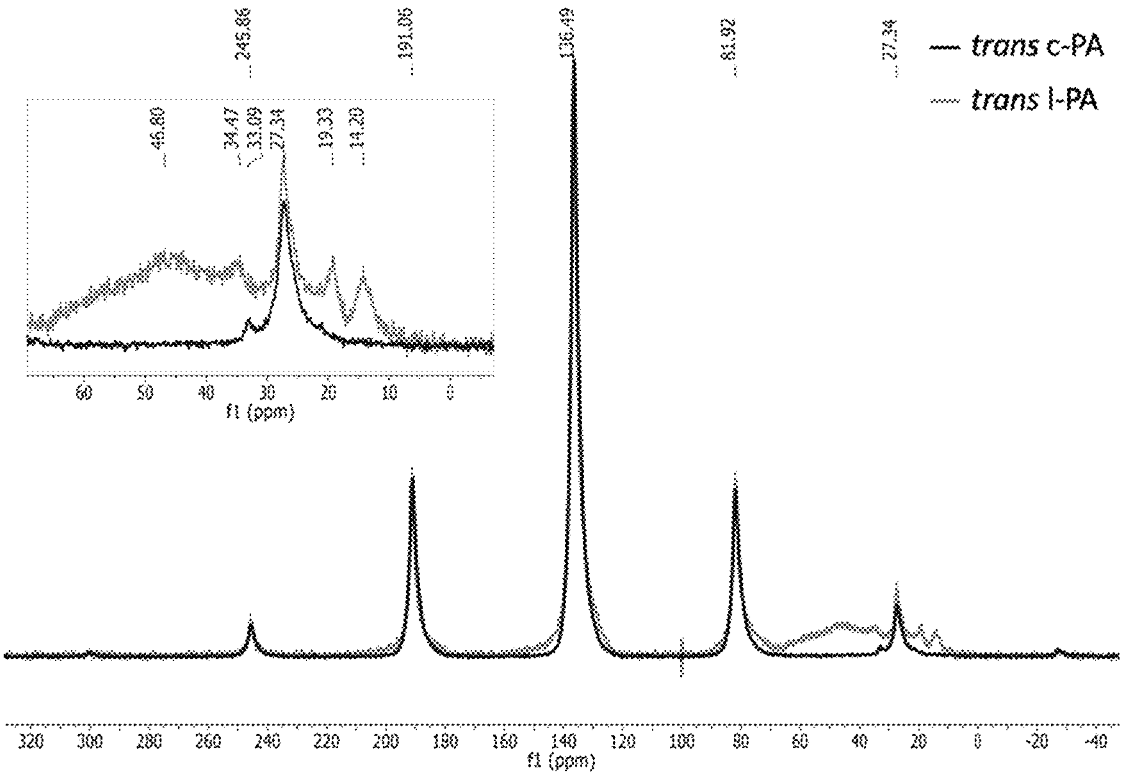
FIG. 5 shows a cross-polarization magic angle spinning (MAS-CP) $^{13}C$ NMR of trans c-PA (black) and trans l-PA (grey).

In agreement with high trans content of >99% evaluated from corresponding IR spectroscopy (FIG. 1), c-PA exhibited a resonance at 136.49 ppm from C atoms in $(CH)_x$, sequences in trans configuration. The CP MAS solid state $^{13}C$ NMR did not exhibit $CH_2$ or $CH_3$ chain end groups at 34.47 and 14.19 ppm, respectively, that were plainly evident in the linear derivatives. The spectrum of l-PA contained a broad resonance between 15 and 70 ppm that was absent in c-PA spectrum. Attributed by others as defects in the linear sample the broad resonance could arise from cross-linking or perhaps saturation. FIG. 5 revealed the resonances overlapped with the side spinning band at 27.34 ppm via adopting a slower spinning speed. The minor impurity in the c-PA sample that resonates at 33.09 ppm and 21.09 ppm were likely due to cross linking and the other resonances. Though not the actual percentage of $sp^3$ hybridized carbons, the integration of $sp^3$ hybridized carbons was 24% and <1% compared to $sp^2$ carbons in l-PA and c-PA, respectively, suggesting the defect percentage amount in c-PA was less than 1%.

Figure 6:
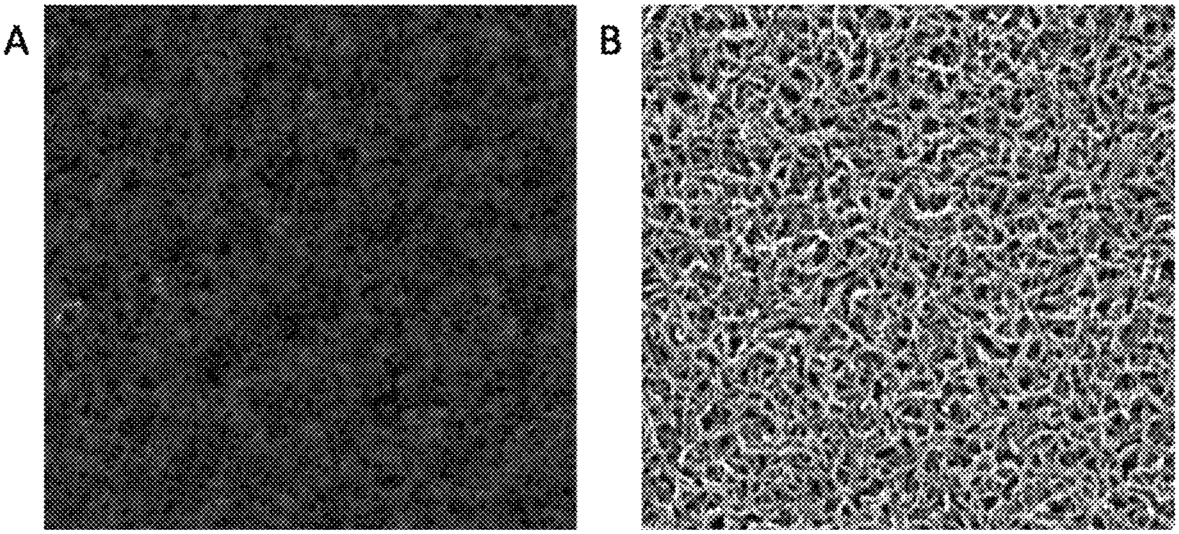
FIG. 6 shows a SEM images of c-PA; (A) SEM image of c-PA on the lustrous side; (B) SEM image of c-PA on the dull side.

Not expected to change, the morphology of c-PA was very similar to reported images of l-PA. FIG. 6 depicts the scanning electron microscopy (SEM) images of the lustrous and dull sides of the thin films prepared with catalyst 1. Presented at the same scale it was obvious that the dull side of the film was loosely packed with larger fibrils, whereas, the lustrous side contained dense fibrils with ~0.33 μm width. Energy Dispersive X-ray Spectroscopy (EDS) performed on the c-PA sample revealed very low metal contamination (0.85% W), whereas the linear sample contained 2.07% Ti and 5.35% Al by weight (ESI).

Magic angle spinning solid state $^{13}C$ NMR—Spinning speed of 8.25 kHz and 6.5 kHz were adopted for collecting $^{13}C$ CP NMR of trans c-PA. Spinning speed of 8.25 kHz was adopted for collecting $^{13}C$ CP NMR.

Figure 7:
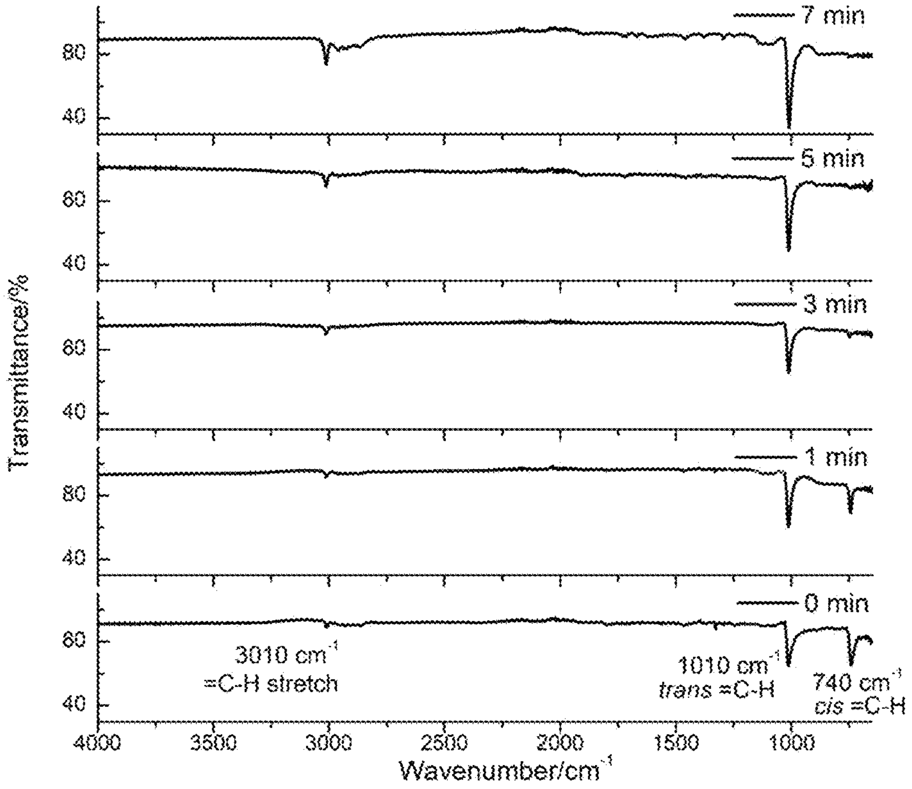
FIG. 7 shows an IR spectroscopy of l-PA produced with $Ti(O^{n}Bu)_4/AlEt_3$catalyst at room temperature, isomerized at 180 °C for 1 min; 3 min; 5 min; and 7 min.

Scanning electron microscope (SEM)—SEM images were taken on both dull and shiny sides of a c-PA film synthesized at 25 °C. FIG. 7 depicts images taken at two different scales.

Example 3—Electrical Conductivity of C-PA

Doping—The polymer films were exposed to Iodine in an evacuated Iodine chamber for 3 h. The excess Iodine was removed by putting the films under dynamic vacuum overnight. The iodine doping percentages were calculated based on the weights before and after doping.

Conductivity—Measuring the sheet resistivity using a 4-point probe station and measuring the thickness with a profilometer gave the resistivity of the polyacetylene films. The conductivity was calculated as 1/resistivity.

Doped samples of c-PA exhibited conductivities at the higher end of the range observed for 1-PA prepared via Shirakawa's method. Table 1 lists the results of the conductivity of c-PA films synthesized under different conditions before and after doping with $I_2$.

TABLE 1

| Sample | Catalyst | Solvent | Temp | Conductivity† | Conductivity after doping |
|---|---|---|---|---|---|
| trans c-PA-1 | 5.0 mg | 300 μL | −78 °C | $1.8 * 10^{-6}$ ohm$^{-1}$cm$^{-1}$ | 82.9 ohm$^{-1}$cm$^{-1}$ |
| trans c-PA-2 | 5.0 mg | 300 μL | 25 °C | $5.5 * 10^{-6}$ ohm$^{-1}$cm$^{-1}$ | 137.0 ohm$^{-1}$cm$^{-1}$ |
| trans c-PA-3 | 5.0 mg | 300 μL | 60 °C | $3.8 * 10^{-6}$ ohm$^{-1}$cm$^{-1}$ | 77.0 ohm$^{-1}$cm$^{-1}$ |
| trans c-PA-4 | 5.0 mg | 200 μL | 25 °C | — | 52.6 ohm$^{-1}$cm$^{-1}$ |
| trans c-PA-5 | 5.0 mg | 600 μL | 25 °C | $1.8 * 10^{-5}$ ohm$^{-1}$cm$^{-1}$ | 221.2 ohm$^{-1}$cm$^{-1}$ |
| trans c-PA-6 | 5.0 mg | 1000 μL | 25 °C | — | 160.2 ohm$^{-1}$cm$^{-1}$ |
| trans c-PA-7 | 1.0 mg | 300 μL | 25 °C | $3.1 * 10^{-5}$ ohm$^{-1}$cm$^{-1}$ | 277.2 ohm$^{-1}$cm$^{-1}$ |
| trans c-PA8 | 2.0 mg | 300 μL | 25 °C | $9.2 * 10^{-6}$ ohm$^{-1}$cm$^{-1}$ | 341.0 ohm$^{-1}$cm$^{-1}$ |
| trans c-PA-9 | 5.0 mg | 300 μL | 25 °C | — | 171.5 ohm$^{-1}$cm$^{-1}$ |

†if no conductivity presented, it was below the measuring limit of the 4-point probe station.

Comparative Example

Linear polyacetylene films were prepared at room temperature using Shirakawa's method as cis/trans mixtures (Shirakawa et al., *Polymer Journal* 1971, 2 (2), 231). Heating at 180 °C for 5 min isomerized the polymer to linear trans-polyacetylene. FIG. 7 depicts the IR of linear polyacetylene films obtained after different amount of time of heating at 180 °C. The cis/trans ratio was calculated using the equation: cis $\%=1.3A_{cis}/(1.3A_{cis}+A_{trans})$ (Ito et al., *Journal of Polymer Science Part a-Polymer Chemistry* 1974, 12 (1), 11-20). The cis/trans ratio for heating for 0 min, 1 min, 3 min, 5 min, and 7 min were 50.0%/50.0%, 27.8%/72.8%, 12.7%/78.3%, 3.8%/92.6%, and 3.3%/96.7%, respectively. FIG. 8 depicts the zoomed in region for stretching vibrations of $CH_2$ and $CH_3$ groups.

Example 4—Synthesis Of Cyclic Bottle Burshes

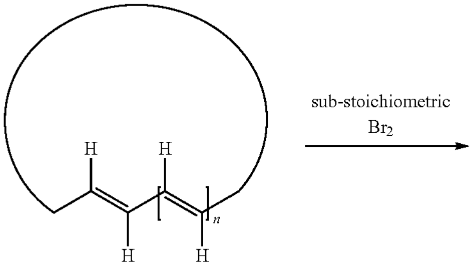

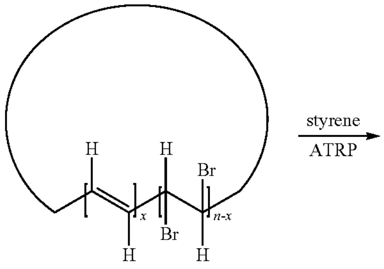

-continued

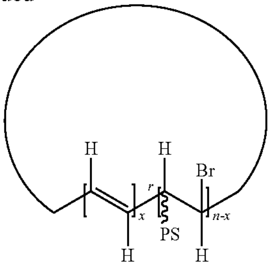

PS = polystyrene

The scheme above depicts the synthesis of cyclic bottle-brushes from temporarily soluble cyclic polyacetylene. Acetylene was bubbled into THF to create a saturated solution. 1.0 mL of the acetylene saturated THF solution was diluted to 4.0 mL and kept at −78 °C. Addition of a toluene solution of tungsten catalyst 1 (0.4 mg/mL, 250.0 μL) initiated the polymerization. The solution slowly turned from colorless to red, to pink, to purple, and then blue. To grow single polymer brushes, bromination needs to occur before precipitation of the cyclic polyacetylene. Therefore, when the solution was purple, bromine was added in aliquots as a dilute solution in THF (20 mg/mL). After the first addition of 5.0 μL, the purple color changed to light pink/orange rapidly. Aiming for partial bromination, addition of an additional 5.0 μL produced a light-yellow solution. Once brominated, atom transfer radical polymerization (ATRP) was initiated with styrene (5000:1 to bromine) prior to aggregation of the polyacetylene using conditions previously established for producing cyclic bottlebrushes (Veige et al., *Macromolecules,* 2020, 53, 22, 9717-9724). After 8 h, the ATRP reached ~3% conversion based on the consumption of styrene monitored via $^1$H NMR spectroscopy. The reaction solution was passed through neutral alumina. The product was precipitated in stirring methanol to provide a cloudy mixture. The volatiles were removed from the cloudy mixture and resulted in a small amount of solid on the side of the vial. A $^1$H NMR spectrum of the solid revealed a resonance attributable to polystyrene, indicating the presence of PS brushes. The solids were dissolved to roughly 0.1 wt %, and spin-coated onto a mica plate for atomic force microscopy (AFM) imaging. FIG. 11A-11F depict the AFM height and phase images of the cyclic bottlebrushes. The cyclic bottlebrush AFM images confirmed that the polyacetylene disclosed herein is cyclic in nature.

What is claimed:

1. A trans-cyclic polyacetylene having at least 50 polymerized monomer units, at least 95% trans double bonds, and less than 1% crosslinking defects.

2. The trans-cyclic polyacetylene of claim 1, having at least 80 polymerized monomer units.

3. The trans-cyclic polyacetylene of claim 2, having an average conjugation length of at least 80.

4. The trans-cyclic polyacetylene of claim 1, having at least 99% trans double bonds.

5. The trans-cyclic polyacetylene of claim 1, further comprising a dopant, wherein the dopant is selected from the group consisting of bromine, iodine, chlorine, inter halogens, $AsF_5$, $SbF_6$, $SbCl_6$, $HClO_4$, $H_2SO_4$, $(NO)(PF_6)$, $Ag(ClO_4)$, lithium, sodium, potassium, and combinations thereof.

6. The trans-cyclic polyacetylene of claim 5, having a conductivity of at least 100 $ohm^{-1}$ $cm^{-1}$.

7. A coated substrate comprising a coating of the trans-cyclic polyacetylene of claim 1 on a substrate, wherein the substrate is selected from the group consisting of a metal, a polymer, silicon, a plastic, wood, glass, and combinations thereof.

8. A polymer comprising the trans-cyclic polyacetylene according to claim 1 as a backbone, and a plurality of polymeric side-chains, wherein the plurality of polymeric side-chains comprises polystyrene, poly(n-butyl acrylate), or both.

9. A method of preparing the trans-cyclic polyacetylene of claim 1 comprising:

admixing acetylene and a catalyst having a structure represented by formula (I) under conditions sufficient to polymerize the acetylene to form the trans-cyclic polyacetylene:

(1)

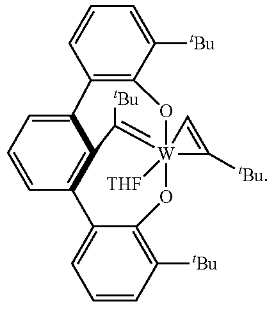

10. The method of claim 9, wherein:

(a) the admixing comprises contacting the acetylene with a catalyst solution of the catalyst and an aprotic solvent, selected from the group consisting of dichloromethane, tetrahydrofuran, ethyl acetate, diethyl ether, 1,4 dioxane, chloroform, pentane, hexane, benzene, toluene, pyridine, and combinations thereof; and (b) the catalyst solution has a catalyst concentration of 0.01 mg/mL to 50 mg/mL.

11. The method of claim 9, wherein the catalyst is coated on a substrate.

12. The method of claim 11, wherein the admixing comprises contacting acetylene gas with the catalyst.

13. The method of claim 12, wherein the acetylene gas further comprises acetone, and the acetylene gas is flowed over the catalyst-coated substrate such that the trans-cyclic polyacetylene forms as a film on the substrate.

14. The method of claim 9, wherein the admixing comprises contacting the catalyst with an acetylene solution comprising a solvent and acetylene, wherein the acetylene solution is saturated with acetylene, and the solvent is an aprotic solvent, selected from the group consisting of dichloromethane, tetrahydrofuran, ethyl acetate, diethyl ether, 1,4 dioxane, chloroform, pentane, hexane, benzene, toluene, pyridine, and a combination thereof.

15. The method of claim 9, wherein the trans-cyclic polyacetylene is a powder or a film.

16. The method of claim 9, wherein the trans-cyclic polyacetylene is formed in solution and is soluble in said solution.

17. The method of claim 9, wherein the trans-cyclic polyacetylene has at least 99% trans double bonds.

18. The method of claim 9, wherein the trans-cyclic polyacetylene has an average conjugation length of 80 or more.

19. The method of claim 9, wherein the catalyst has an initial turnover frequency of at least 500,000 $g/mol_{cat}/h$.

* * * * *